United States Patent
Martch et al.

(10) Patent No.: US 8,583,969 B2
(45) Date of Patent: *Nov. 12, 2013

(54) METHODS AND APPARATUS FOR DETECTING REMOTE CONTROL ERRORS IN CONTROLLED DEVICES

(75) Inventors: Henry Gregg Martch, Parker, CO (US); Michael John Bazata, Elizabeth, CO (US); Benjamin Raymond Mauser, Highlands Ranch, CO (US)

(73) Assignee: EchoStar Technologies, L.L.C., Englewood, CO (US)

( * ) Notice: Subject to any disclaimer, the term of this patent is extended or adjusted under 35 U.S.C. 154(b) by 300 days.

This patent is subject to a terminal disclaimer.

(21) Appl. No.: 12/985,683

(22) Filed: Jan. 6, 2011

(65) Prior Publication Data
US 2011/0107159 A1 May 5, 2011

Related U.S. Application Data

(63) Continuation of application No. 12/117,657, filed on May 8, 2008, now Pat. No. 7,890,816.

(51) Int. Cl.
*G06F 11/00* (2006.01)

(52) U.S. Cl.
USPC ............... 714/57; 714/25; 345/168; 348/114; 348/734

(58) Field of Classification Search
USPC ............ 714/2, 5.1, 25, 26, 47.1, 57; 345/169; 348/114, 734
See application file for complete search history.

(56) References Cited

U.S. PATENT DOCUMENTS

| | | |
|---|---|---|
| 2004/0119894 A1 | 6/2004 | Higgins et al. |
| 2005/0216606 A1 | 9/2005 | Hayes et al. |
| 2005/0289383 A1* | 12/2005 | Illowsky et al. ................... 714/2 |
| 2007/0113162 A1 | 5/2007 | Lery |
| 2008/0010482 A1* | 1/2008 | Tsang ............................. 714/2 |
| 2008/0178224 A1 | 7/2008 | Laude et al. |
| 2008/0280586 A1* | 11/2008 | Den Ouden ................... 455/352 |
| 2009/0064251 A1 | 3/2009 | Savoor et al. |
| 2009/0239587 A1 | 9/2009 | Negron et al. |
| 2009/0284472 A1 | 11/2009 | Mehta et al. |

OTHER PUBLICATIONS

USPTO "Non-Final Office Action" mailed Jun. 7, 2010; U.S. Appl. No. 12/117,657, filed May 8, 2008.
USPTO "Notice of Allowance" mailed Oct. 27, 2010; U.S. Appl. No. 12/117,657, filed May 8, 2008.

* cited by examiner

*Primary Examiner* — Joseph D Manoskey
(74) *Attorney, Agent, or Firm* — Ingrassia Fisher & Lorenz, P.C.

(57) ABSTRACT

Apparatus, systems and methods are described that facilitate the detection of errors within a remote control for a controlled device. A remote control detects an error condition during operation and transmits information regarding the error to a controlled device. The information regarding the error may be analyzed to determine the source of the problem in the remote control and/or possible solutions.

20 Claims, 6 Drawing Sheets

METHODS AND APPARATUS FOR DETECTING REMOTE CONTROL ERRORS IN CONTROLLED DEVICES

RELATED APPLICATIONS

This application claims the benefit of U.S. application Ser. No. 12/117,657, entitled "SYSTEMS, METHODS AND APPARATUS FOR DETECTING REMOTE CONTROL ERRORS", filed on May 8, 2008, which is hereby incorporated by reference in its entirety.

BACKGROUND

Universal remote controls and other advanced remote controls are designed for communicating with a variety of devices, including televisions, satellite and cable receivers, digital video recorders (DVRs), digital video disk (DVD) players, stereo systems and the like. To facilitate communication with these various devices, the remote controls may store various settings, including the address of the remote, databases of key codes for each of the controlled devices, learned remote codes and various user settings. The various settings are typically stored in non-volatile memory (NVM) within the remote control, and are loaded into random access memory (RAM) and utilized by a processor during operation of the remote control. Occasionally, problems may arise while reading or writing data from the RAM and/or the NVM due to electrostatic discharge (ESD), component failures, software bugs and the like. Thus, the remote control may become unable to remotely operate the controlled devices.

Remote communication problems are frustrating for users because they are often unable to detect the source of the problem. To remedy the problem, the user may call a customer service representative (CSR) who then attempts to identify the source of the problem based on information provided by a user. However, the customer service representative (CSR) may not have adequate information to determine the source of the problem, and thus may be unable to correctly remedy the problem for the user.

BRIEF DESCRIPTION OF THE DRAWINGS

The same number represents the same element or same type of element in all drawings.

DETAILED DESCRIPTION

The various embodiments described herein generally provide apparatus, systems and methods which facilitate the detection of errors within a remote control. More particularly, a remote control detects an error condition during operation and transmits information regarding the error to a controlled device, such as a satellite receiver or cable television receiver set-top box. The information regarding the error may be analyzed to determine the source of the problem in the remote control and/or possible solutions.

The controlled device may include any type of device or system that includes a wireless remote controller, including entertainment devices, presentation devices, household appliances (e.g., washing machines, fans, humidifiers, vacuums, stoves and ovens), vehicles, heating systems, lighting systems, cameras, recording devices and the like. While the controlled device is described herein as an entertainment device that presents content to a user, it is to be appreciated that the teachings may be applied to detecting remote control errors for a remote control of any type of device.

In at least one embodiment, a controlled device receives information regarding an error of a remote control in the form of a key code for the controlled device. Based upon the received key code, the controlled device may identify that an error occurred within the remote control and take appropriate action. In at least one embodiment, the controlled device may perform processing of the key code to determine the source of the error and provide an indication of the error to the user. The controlled device may store the key code for subsequent processing and/or transmission to external devices. In at least one embodiment, the controlled device transmits the key code or other information regarding the error to a remote application server over a communicatively coupled communication network. The application server may utilize the error information for performing analysis regarding the problem within the remote control. For example, there may be multiple error key codes, each corresponding with a different possible remote control error. Thus, the controlled device, the application server and/or a customer service representative may identify the error based on the key code and provide feedback to the user regarding the source of the error and/or a remedy for the problem.

Figure 1:
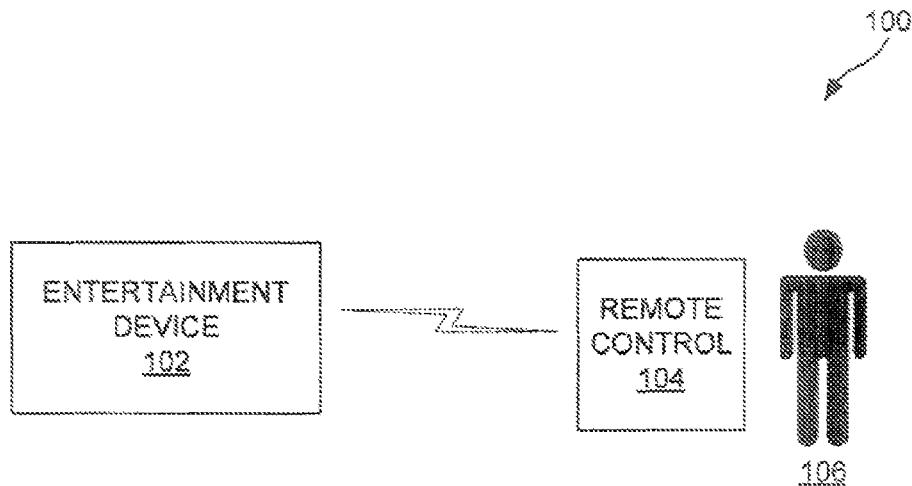
FIG. 1 illustrates an embodiment of an entertainment system.

FIG. 1 illustrates an embodiment of an entertainment system 100. The entertainment system 100 presents content to a user 106. The entertainment system 100 includes an entertainment device 102 and a remote control 104. Each of these components is discussed in greater detail below. The entertainment system 100 may include other devices, components or elements not illustrated for the sake of brevity.

The entertainment device 102 is configured to receive content from one or more internal or external content source(s) (not shown in FIG. 1), and to present the received content to the user 106 and/or output the content for presentation by a presentation device. The content to be outputted and/or presented by the entertainment device 102 may come in any of various forms including, but not limited to, audio, video, data, information, or otherwise. In at least one embodiment, the content presented to the user 106 includes an audio/video stream (A/V), such as a television program, movie or other recorded content and the like. While the entertainment device 102 will be described below in the context of presenting A/V content, it is to be appreciated that the teachings described herein may be applied to presenting any type of content.

In at least one embodiment, the entertainment device 102 is a presentation device operable to present content to the user 106. For example, the entertainment device 102 may be a display device configured to display content to the user 106 or an audio device configured to output audio content to the user 106. In other embodiments, the entertainment device 102 may be an output device that processes and provides one or more audio and/or video streams to a display device (e.g., a television) for presentation to the user 106. Exemplary output devices include set-top boxes (e.g., a satellite or cable television receiver/converter boxes), DVRs, DVD players, media servers or other similar devices. It is to be appreciated that the entertainment device 102 may also be embodied as an apparatus combining the functionality of a presentation device and an output device, such as a television with an integrated set-top box, DVR or the like.

The remote control 104 may comprise any system or apparatus configured to remotely operate the entertainment device 102. In at least one embodiment, the remote control 104 may manipulate playback of content by the entertainment device 102. The entertainment device 102 and the remote control 104 may communicate using any type of communication medium and any type of communication protocol. For example, the remote control 104 may wirelessly communicate with the entertainment device 102 over a radio frequency (RF) or infrared (IR) communication link.

In at least one embodiment, the remote control 104 receives user input from the user 106 requesting to remotely control the entertainment device 102. For example, the user input may request to manipulate playback of content outputted for presentation by the entertainment device 102. The user 106 may provide the user input by pressing one or more buttons of the remote control 104. In at least one embodiment, the remote control 104 identifies the pressed button and generates a key code corresponding with the pressed button. The generated key code is transmitted by the remote control 104 to the entertainment device 102. The entertainment device 102 receives the key code and performs appropriate processing functions based on the key code (e.g., changing its operation or manipulating playback of content).

During operation, errors may occur within the remote control 104. For example, software operating on the remote control 104 may encounter problems, there may be errors reading data from memory, or data from memory may become corrupted. In at least one embodiment, an error is detected while reading remote control settings from the non-volatile memory (NVM) of the remote control 104.

The remote control 104 may perform various functions responsive to detecting an error. In at least one embodiment, the remote control 104 may responsively transmit information regarding the error to the entertainment device 102. For example, the entertainment device 102 may transmit a key code to the entertainment device 102, the key code indicating the particular type of error that occurred within the remote control 104. In at least one embodiment, the entertainment device 102 performs processing of the key code to identify the source of the error and to provide a notification regarding the error to the user 106. In other embodiments, the information regarding the error may be stored by the entertainment device 102 for subsequent utilization, as described in further detail below.

In at least one embodiment, the remote control 104 stores information regarding the error for subsequent utilization and/or debugging. For example, the remote control 104 may increment a counter each time an error occurs or may generate an error log entry that includes information regarding the runtime conditions at the time the error occurred. Thus, the counter stores a number of instances in which the error occurred on the remote control 104. In at least one embodiment, the stored information regarding the error may be subsequently retrieved from the remote control 104 by the entertainment device 102. For example, the remote control 104 may include bi-directional communication functionality and the entertainment device 102 may be operable to query the remote control 104 for the stored error information responsive to a request.

Figure 2:
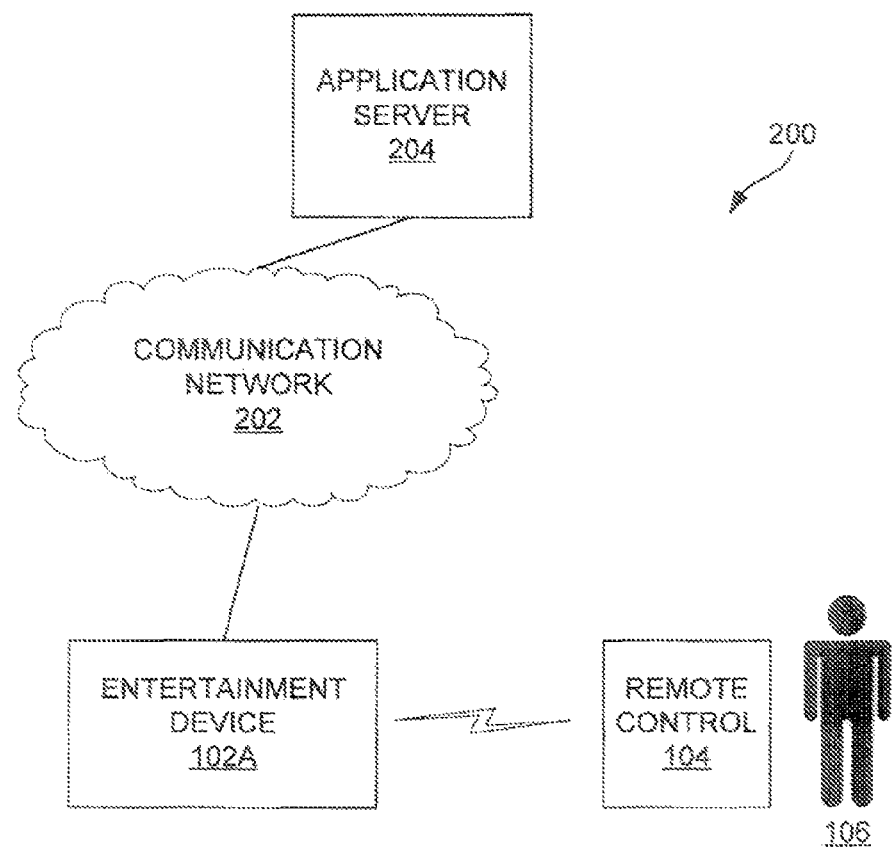
FIG. 2 illustrates an embodiment of a communication system.

When the user 106 encounters a problem that they are unable to identify and/or solve, then they are likely to contact customer support in order to remedy the problem. Thus, it may be desirable to transmit error information regarding the remote control 104 to devices external to the entertainment system 100. FIG. 2 illustrates an embodiment of a communication system 200. The communication system includes an entertainment device 102A, a remote control 104, a communication network 202 and an application server 204. Each of these components is discussed in greater detail below. The description of components common to FIG. 1 is omitted herein for the sake of brevity and the communication system 200 may include other components, devices or elements not illustrated for the sake of brevity.

The entertainment device 102A is similar to the entertainment device 102 of FIG. 1, and is further communicatively coupled to an application server 204 through a communication network 202. More specifically, the entertainment device 102A is operable for transmitting to the application server 204 information regarding the error In at least one embodiment, information regarding the error occurring within the remote control 104 is stored on the entertainment device 102A, and the entertainment device 102A transmits the error information to the application server 204 responsive to the query. If the information regarding the error is not stored on the entertainment device 102A, then the entertainment device 102A may query the remote control 104 for the error information. Responsive to receiving information from the remote control 104, the entertainment device 102A transmits the information received from the remote control 104 to the application server 204 for utilization by the customer service representative (CSR). The customer service representative (CSR) and/or the application server 204 then identify the source of the problem using the error information and recommend solutions to remedy the problem within the remote control.

Figure 3:
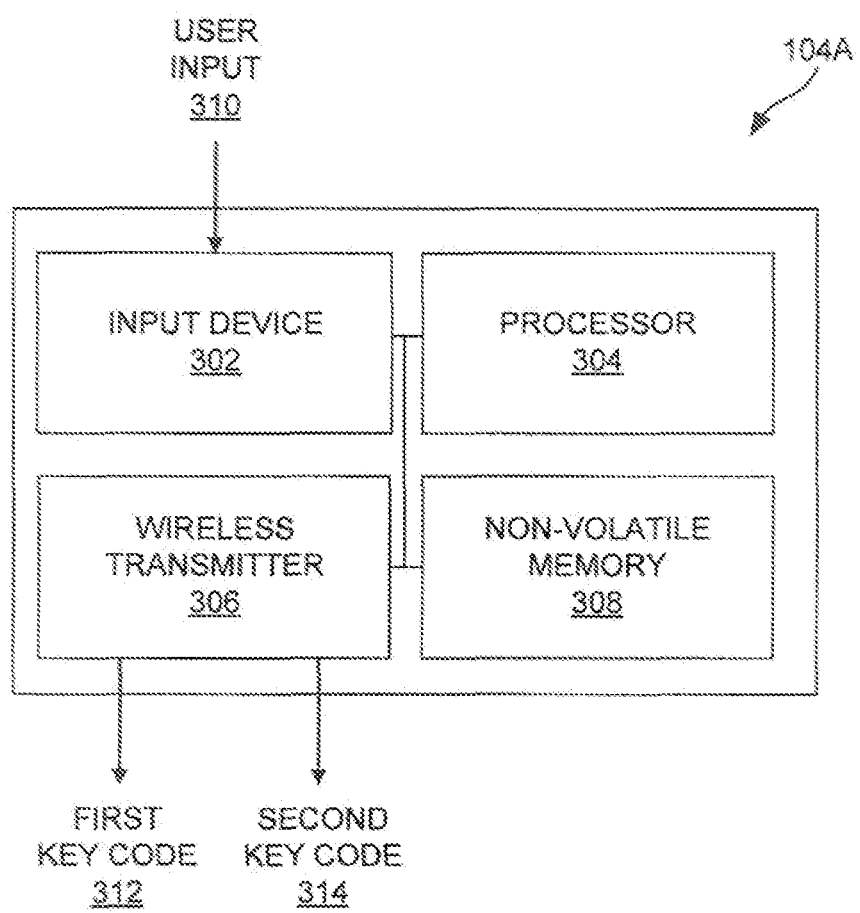
FIG. 3 illustrates an embodiment of a remote control of FIG. 2.

FIG. 3 illustrates an embodiment of a remote control 104A of FIG. 1. FIG. 3 will be discussed in reference to the communication system 200 illustrated in FIG. 2. The remote control 104A includes an input device 302, a processor 304, a wireless transmitter 306 and a non-volatile memory (NVM) 308. Each of these components will be discussed in greater detail below. The remote control 104A may include other components or devices not illustrated for the sake of brevity.

The input device 302 is operable for receiving user input 310 from the user 106 (see FIG. 2). In at least one embodiment, the input device 302 is a keypad including a set of buttons. A user may utilize the keypad to input channel numbers, control the volume of the entertainment device 102 (see FIG. 2), navigate menus, manipulate playback of content by the entertainment device 102 and/or control other functions of the entertainment device 102.

The non-volatile memory (NVM) 308 is operable for storing settings of the remote control 104A. Exemplary settings include the address of the remote control 104, databases of key codes for each device controlled by the remote control (e.g., the entertainment device 102) and learned remote codes. In at least one embodiment, the non-volatile memory (NVM) 308 may store a counter, error logs and/or other information regarding any type of error occurring within the remote control 104A. The non-volatile memory (NVM) 308 may include any type of memory operable for storing information even when not powered, such as flash memory or magnetic storage devices. occurring within the remote control 104. The application server 204 processes the error information to determine the source of the error and/or recommend solutions to the problem.

The application server 204 may be any device or system that receives the error information from the entertainment device 102A through the communication network 202. In at least one embodiment, the application server 204 utilizes the error information received from the entertainment device 102A to identify and/or diagnosis a problem in a particular remote control 104. For example, the user 106 may experience a problem with the remote control 104, and the application server 204 may utilize the error information to correct the problem. In some embodiments, the error information received by the application server 204 may be utilized to perform diagnostics information regarding an entire line of products. For example, the application server 204 may identify that a high number of data corruption problems are occurring within a particular model remote control, and may recommend solutions to remedy the data corruption problem.

In at least one embodiment, the application server 204 may receive the error information from the entertainment device 102A periodically according to a defined, schedule. For example, the application server 204 may receive error information (if any) from the entertainment device 102A once a week. In other embodiments, the application server 204 may receive the error information from the entertainment device 102A responsive to the error occurring within the remote control 104. In other words, after the entertainment device 102A receives information regarding the error from the remote control 104, then the entertainment device 102A may transmit the error information to the application server 204 for analysis.

In at least one embodiment, the application server 204 receives the error information from the entertainment device 102A responsive to a query. For example, the application server 204 may be integrated within a call processing system of a content provider. The user 106 calls the call processing system responsive to experiencing a problem with the remote control 104. A customer service representative (CSR) initiates a query to the entertainment device 102A, through the application server 204, requesting information regarding any errors that occurred within the remote control 104.

The processor 304 is operable for controlling the operation of the remote control 104A. More particularly, the processor 304 is operable for generating commands (e.g., key codes) that are compatible with the entertainment device 102 (see FIG. 2). The processor 304 receives the user input 310 from the input device 302 and translates the user input 310 into a first key code 312. The first key code 312 may then be transmitted to the entertainment device 102 for further processing.

Various errors may occur during operation of the remote control 104A. For example, the processor 304 may encounter an error during generation of the first key code 312. Typically errors encountered by the processor include corruption of data stored within the non-volatile memory (NVM) 308 and/or errors reading from RAM communicatively coupled to the processor 304. Corruption of data within the non-volatile memory (NVM) 308 may be caused by among other things, electrostatic discharge (ESD), component failures and software bugs. If data in RAM is corrupted, then the data may be reloaded into RAM from the non-volatile memory (NVM) 308. If data is corrupted in both RAM and the non-volatile memory (NVM) 308, then the remote control 104A may need to revert to default settings, which may adversely affect the functionality of the remote control 104A for the user.

Data stored in the RAM and the non-volatile memory (NVM) 308 is protected by some form of error detection field. Examples may include checksums, parity fields, and cyclic redundancy checks. When data is written into RAM or the non-volatile memory (NVM) 308, the associated error detection field is calculated and also written into the RAM or non-volatile memory (NVM) 308. When reading data from RAM or NVM, the error detection fields are used to determine if the data within the device is correct or if it has been corrupted.

In at least one embodiment, responsive to detecting an error, the processor 304 generates a second key code 314. The second key code 314 indicates to the entertainment device 102 that an error occurred within the remote control 104A. In at least one embodiment, there are multiple key codes defined for different types of errors. For example, one key code may indicate a RAM data corruption and a second key code may indicate a non-volatile memory (NVM) data corruption. It is to be appreciated that any number of key codes may be utilized to identify errors based on desired design criteria.

The wireless transmitter 306 is operable for wirelessly communicating with the entertainment device 102 (see FIG. 2). More particularly, the wireless transmitter 306 is operable for transmitting the first key code 312 and the second key code 314 to the entertainment device 102 (see FIG. 2). The wireless transmitter 306 may utilize any type of wireless protocol and wireless communication medium, including RF or IR key codes.

In at least one embodiment, the wireless transmitter 306 is embodied in a wireless transceiver that provides bi-directional communication capability between the entertainment device 102 and the remote control 104A. For example, the wireless transmitter 306 may receive a query from the entertainment device 102 for information regarding any errors that have occurred within the remote control 104A. The processor 304 may then generate the second key code 314 responsive to the query, and the wireless transmitter 306 then transmits the second key code 314 to the entertainment device 102 to satisfy the query.

It is to be appreciated that the various functional elements 302 through 308 shown as operable within the remote control 104A may be combined into fewer discrete elements or may be broken up into a larger number of discrete functional elements as a matter of design choice. Thus, the particular functional decomposition suggested by FIG. 3 is intended merely as exemplary of one possible functional decomposition of elements within the remote control 104A.

Figure 4:
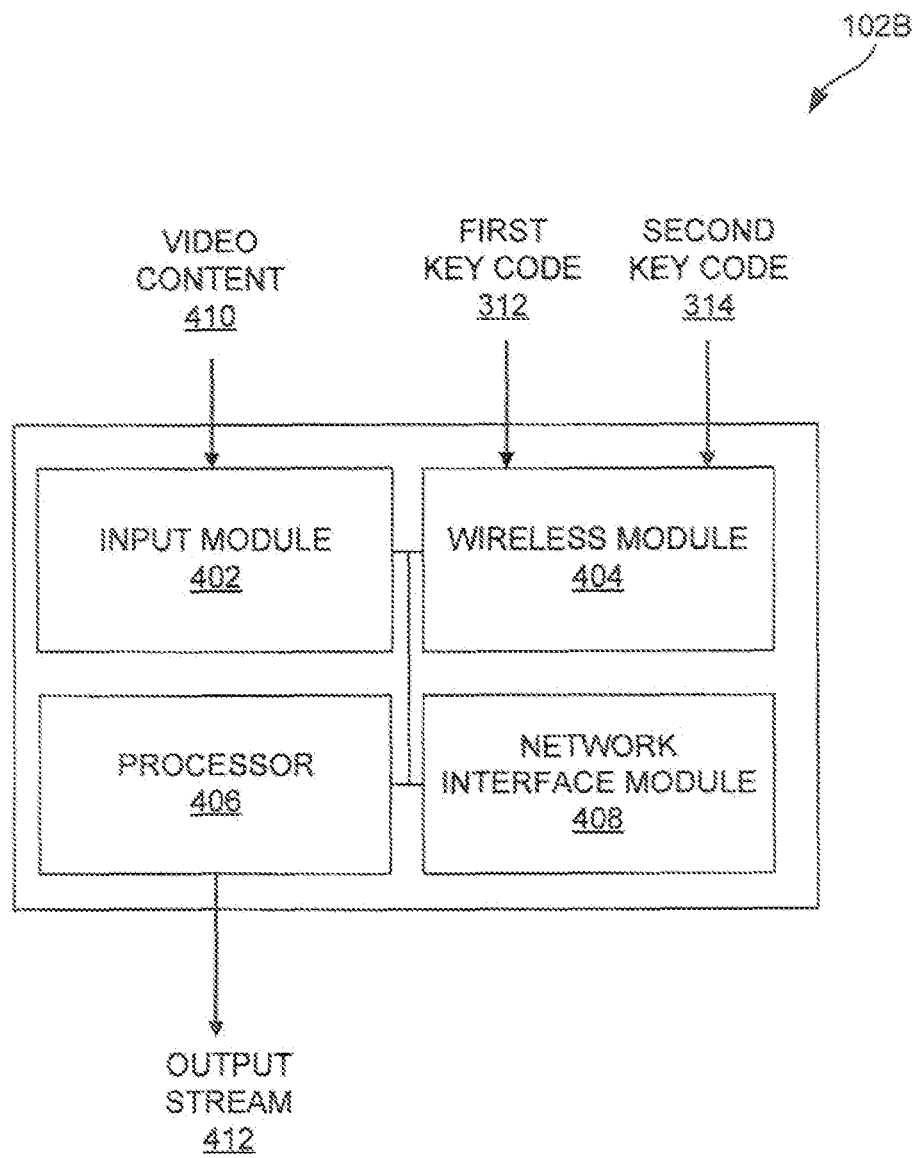
FIG. 4 illustrates an embodiment of an entertainment device of FIG. 2.

FIG. 4 illustrates an embodiment of an entertainment device 102B of FIG. 1. More particularly, FIG. 4 illustrates an entertainment device 102B embodied as a television receiver (e.g., a set-top box). However, it is to be appreciated that the entertainment device 102 may comprise any type of device that presents any type of presentation content. FIG. 4 will be discussed in reference to the communication system 200 illustrated in FIG. 1-2. The entertainment device 102B includes an input module 402, a wireless module 404, a processor 406 and a network interface module 408. Each of these components will be discussed in greater detail below. The entertainment device 102B may include other components or devices not illustrated for the sake of brevity.

The input module 402 is operable for receiving presentation content, e.g., video content 410. The input module 402 may be operable for receiving and tuning any type of video content 410. For example, the input module 402 may receive an over-the-air broadcast signal, a direct broadcast satellite signal or a cable television signal. In at least one embodiment, the input module 402 may receive or retrieve content from a storage medium, such as an optical disk, internal or external hard drives, portable storage devices (e.g., universal serial bus (USB) memory sticks) and the like. The input module 402 may also receive content from external servers, such as video servers, that are communicatively coupled to the entertainment device 102B over the internet or other types of data networks.

The wireless module 404 is operable to wirelessly receive and/or transmit data to the remote control 104 (see FIG. 2). The wireless module 404 may communicate with the remote control 104 utilizing any type of IR or RF communication link. In at least one embodiment, the wireless module 404 receives the first key code 312 and/or the second key code 314 from the remote control 104, and responsively provides the first key code 312 and/or the second key code 314 to the processor 406.

The processor 406 is operable for controlling the operation of the entertainment device 102B. In at least one embodiment, the processor 406 receives the video content 410 and responsively generates an output stream 412 for presentation on a display device. The processor 406 is further operable to receive the first key code 314 and manipulate the playback of the video content 410 responsive to the first key code 314. In other words, the processor 406 operates responsive to the first key code 314 to control the output stream 412.

The processor 406 is further operable to receive the second key code 314 and identify that an error occurred within the remote control 104 (see FIG. 2). In at least one embodiment, the processor 406 identifies the error occurring within the remote control 104 based on the second key code 314, and provides an indication of the error in the output stream 412. For example, the output stream 412 may display a message to the user 106 (see FIG. 2) regarding the error. In some embodiments, the processor 406 may provide the second key code 314, or information generated based therefrom, to an application server 204 (see FIG. 2).

A network interface module 408 of the entertainment device 102A communicatively couples to the application server 204 through the communication network 202. The network interface module 408 and the application server 204 may communicate over any type of network topology and/or communication link. For example, the application server 204 may query the entertainment device 102B for the second key code 314. In at least one embodiment, if the second key code 314 is not available to the processor 406, then the wireless module 404 may transmit a query to the remote control 104 requesting the second key code 314. After the entertainment device 102B receives the second key code 314, the network interface module 408 transmits the second key code 314 to the application server 204 to satisfy the query.

Those of ordinary skill in the art will appreciate that the various functional elements 402 through 408 shown as operable within the remote control 104B may be combined into fewer discrete elements or may be broken up into a larger number of discrete functional elements as a matter of design choice. Thus, the particular functional decomposition suggested by FIG. 4 is intended merely as exemplary of one possible functional decomposition of elements within the remote control 104B.

Figure 5:
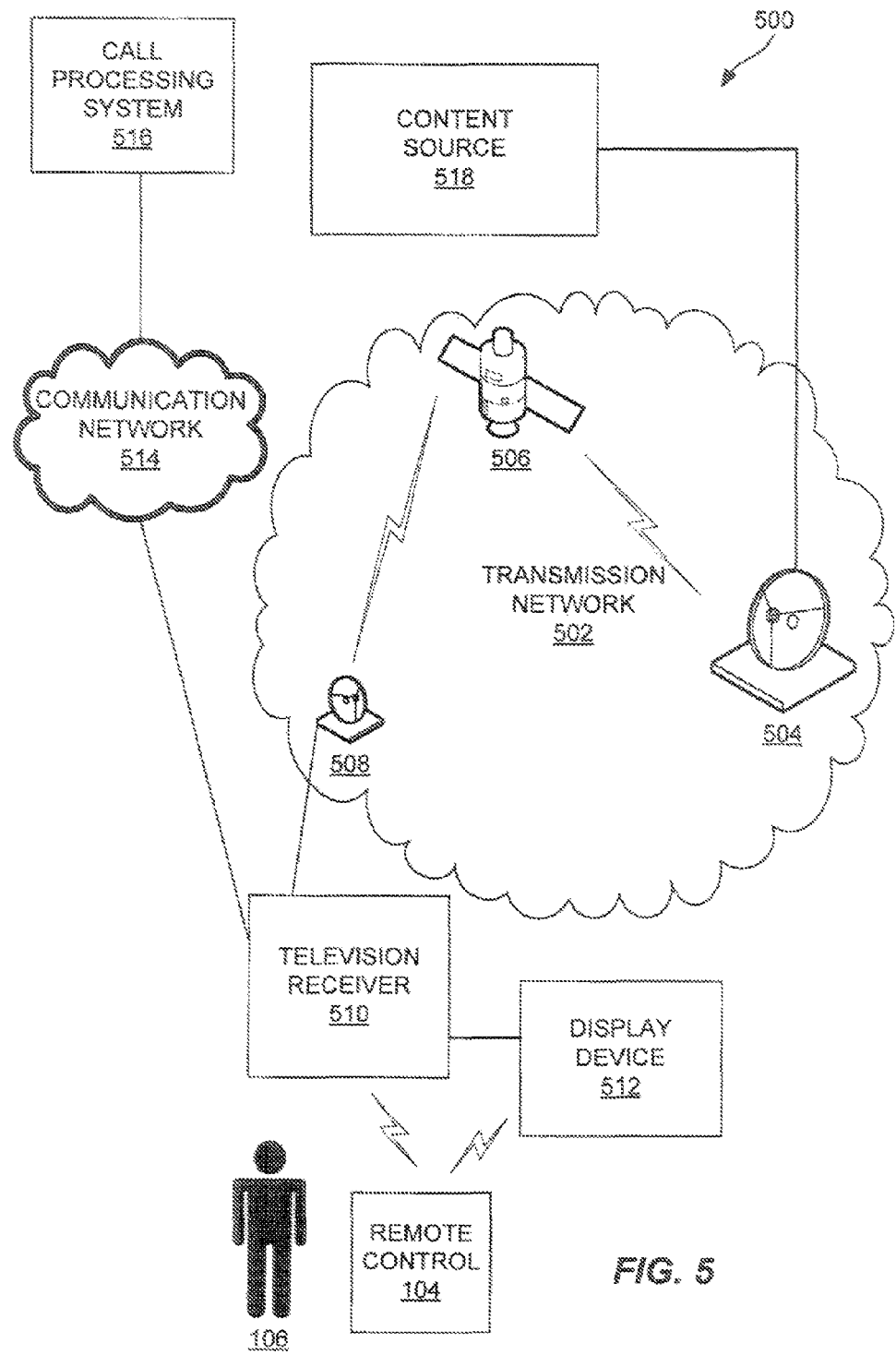
FIG. 5 illustrates an embodiment of a satellite broadcast system.

The remote control 104 and the entertainment device 102 may be utilized in various types of content delivery systems that utilize television receivers, including satellite television broadcast systems, cable television broadcast systems and internet television broadcast and/or delivery systems. FIG. 5 illustrates an embodiment of a satellite broadcast system 500. The satellite broadcast system 500 includes a remote control 104, a transmission network 502, an uplink system 504, a satellite 506, a satellite antenna 508, a television receiver 510, a display device 512, a communication network 514, a call processing system 516 and a content source 518. Each of these components will be discussed in greater detail below.

Discussion of components common to FIGS. 1-4 is omitted for the sake of brevity, and FIG. 5 may include other components not illustrated for the sake of brevity.

Satellite broadcast system 500 includes a content source 518 in signal communication with an uplink system 504 of a transmission network 502. The content source 518 provides the uplink system 504 with television programs that are transmitted to a television receiver 510. Television programs may be broadcast by the transmission network 502 to the television receiver 510. A television program may be embodied as MPEG-2, MPEG-4 or other digital video signals, analog or baseband signals, and/or other video data on a channel of the satellite broadcast system 500.

Satellite broadcast system 500 further comprises a satellite 506 in signal communication with the uplink system 504. The satellite 506 broadcasts television programs received from the uplink system 504. The satellite broadcast system 500 further comprises a satellite antenna 508 for receiving the television program broadcast from the satellite 506. The satellite antenna 508 is in signal communication with the television receiver 510, and provides the television receiver 510 with the television program. The broadcast television program content is received by the television receiver 510 and outputted for presentation on the display device 512.

The user 106 utilizes the remote control 104 to provide user input requesting manipulation of playback of the television program by the television receiver 510. In at least one embodiment, the remote control 104 encounters an error during processing of the user input, and transmits a key code to the television receiver 510 indicating a status of the error.

The user 106 notices the error, and places a call to the call processing system 516 to discuss the error with a customer service representative (CSR). The customer service representative (CSR) initiates a query to the television receiver 510 through the communication network 514 for information regarding errors encountered by the remote control 104. The communication network 514 may comprise any type of wired or wireless network that communicatively couples the call processing system 516 and the television receiver 510. For example, the call processing system 516 may communicate with the television receiver 510 over a broadband network or through a telephone modem of the television receiver 510. In at least one embodiment, the communication network 514 is integrated with the transmission network 502. In other words, the television receiver 510 communicates with the call processing system 516 through messages transmitted over the transmission network 502.

The television receiver 510 receives the query and transmits information regarding the error back to the call processing system 516. In at least one embodiment, the television receiver 510 transmits the key code received from the remote control to the call processing system 516. The call processing system 516 then analyzes the key code to diagnosis a source of the error in the remote control 104. A customer service representative (CSR) of the call processing system 516 may then utilize the source of the error to recommend a solution to the user 106.

Figure 6:
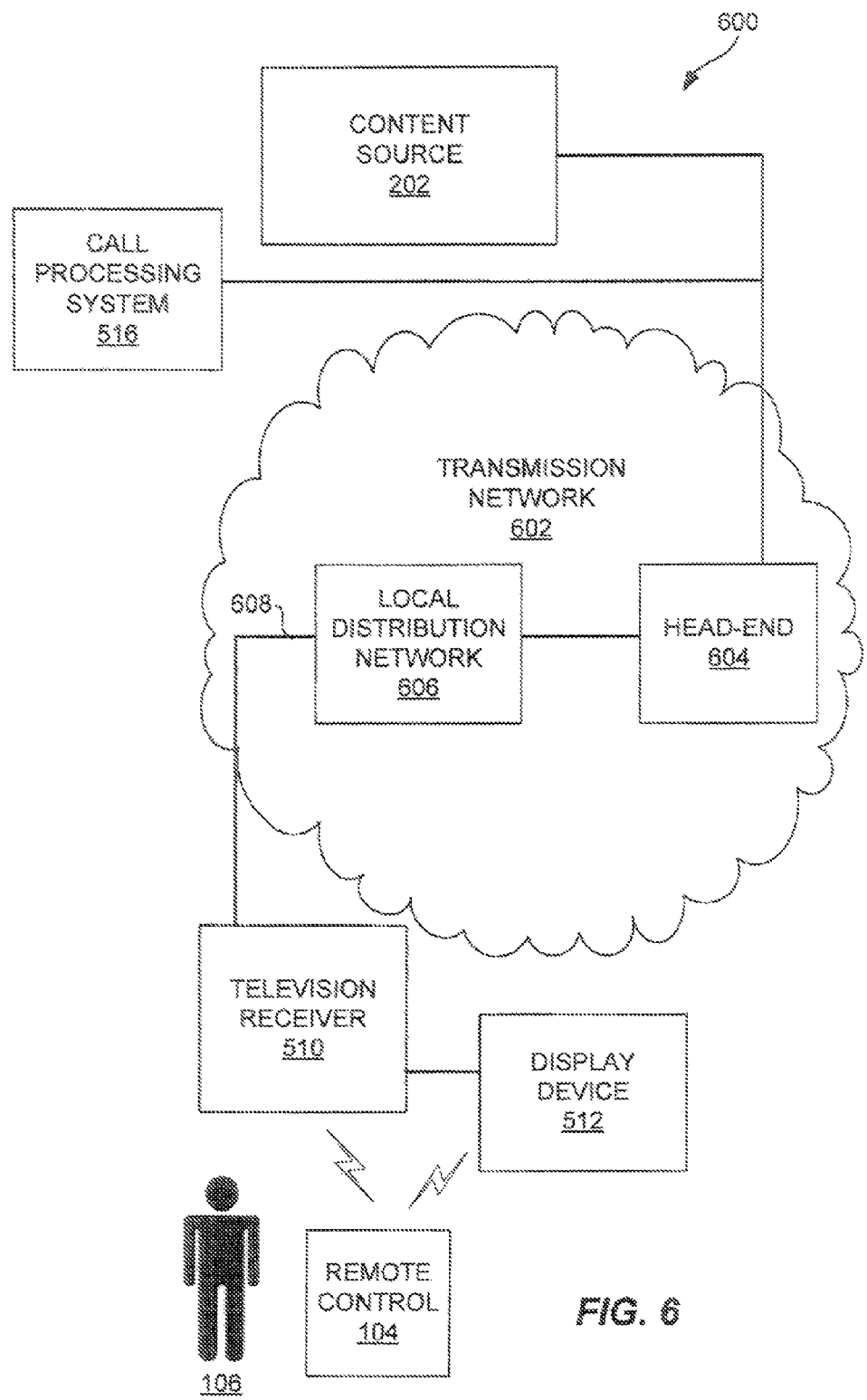
FIG. 6 illustrates an embodiment of a cable television distribution system.

The transmission network 502 (see FIG. 2) may alternatively be embodied as a cable television distribution system. FIG. 6 illustrates an embodiment of a cable television distribution system 600. The cable television distribution system 600 includes a remote control 104, a television receiver 510, a display device 512, a call processing system 516, a content source 518, a transmission network 602, a head-end 604, a local distribution network 606 and a drop 608. Each of these components will be discussed in greater detail below. Discussion of components common to FIGS. 1-4 is omitted for the sake of brevity, and FIG. 6 may include other components not illustrated for the sake of brevity.

Cable television distribution system 600 comprises a head-end 604 in signal communication with the content source 518. The content source 518 provides the head-end 604 with television programs that are transmitted to the television receiver 510. Television programs may be broadcast by the transmission network 602, or may be pushed to the television receiver 510 responsive to a request by the user 106 (e.g., on-demand-viewing).

Cable television distribution system 600 further comprises a local distribution network 606 in signal communication with the head-end 604. The local distribution network 606 is operable for receiving content from the head-end 604 and distributing the content to individual television receivers 510. The television receiver 510 is in signal communication with the local distribution network 606 using a drop 608 from a feeder line of the local distribution network 606. The local distribution network 606 may provide content as a broadcast to the television receiver 510, or may provide content to a specific addressable television receiver 510 using a broadband connection. Responsive to receiving the content, the television receiver 510 outputs the content for presentation by the display device 512.

As described in FIG. 4, the user 106 encounters a problem while remotely controlling the television receiver 510, and calls the call processing system 516. The call processing system 516 queries the television receiver 510 for information regarding the error occurring within the remote control 104. In at least one embodiment, the call processing system 516 and the television receiver 510 are communicatively coupled through the transmission network 602. However, it is to be appreciated that a separate communication network may be utilized to communicate data between the call processing system 516 and the television receiver 510.

In at least one embodiment, the television receiver 510 receives the query from the call processing system 516, and further queries the remote control 104 for information regarding any errors encountered by the remote control. For example, the remote control 104 may maintain a counter indicating the number of times that NVM data corruption and RAM data corruption problems have been encountered during operation. The remote control 104 transmits the counter information to the television receiver 510, and the television receiver 510 further transmits the counter information to the call processing system 516. The call processing system 516 then presents the counter information (or other information derived therefrom) to an operator to identify the source of the problem. For example, the operator may see that there have been 5 NVM failures during the life of the remote control 104, and may identify that the NVM in the remote control 104 has failed. Thus, the operator may recommend that the user 106 replace the remote control 104 or may initiate delivery of a new remote control to the user 106. Thus, through the operation of the cable television distribution system 600, an operator of a call processing system 516 may query a remote control 104 for information regarding errors encountered during operation of the remote control 140, diagnosis the source of the errors and recommend solutions to a user 106.

Figure 7:
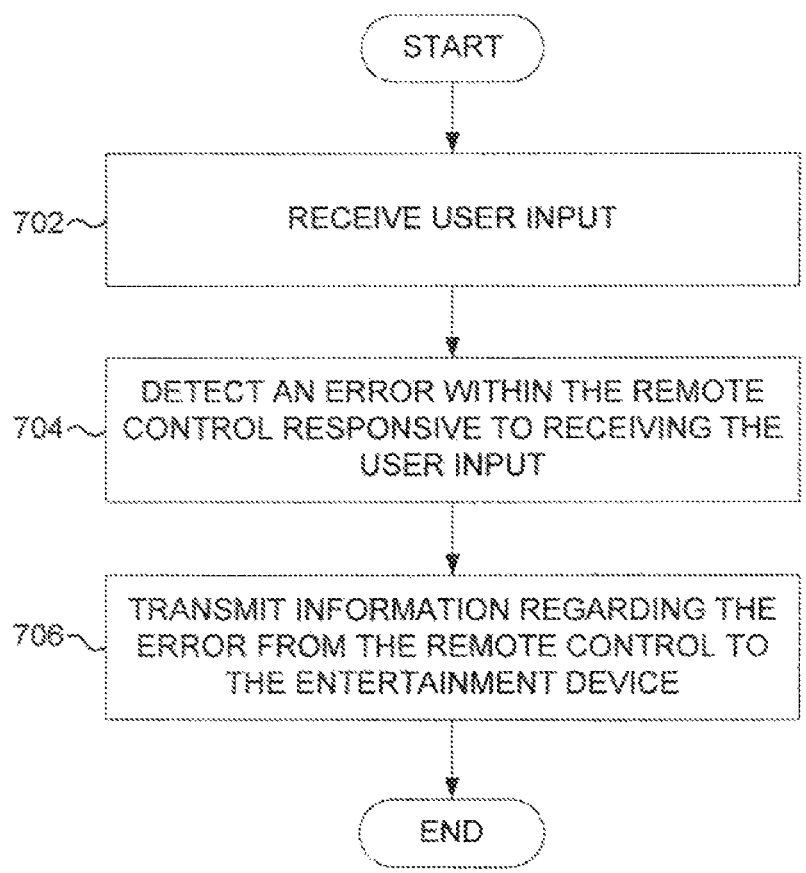
FIG. 7 illustrates an embodiment of a process for detecting errors within a remote control.

FIG. 7 illustrates an embodiment of a process for detecting errors within a remote control. The process of FIG. 7 will be discussed in reference to a remote control for an entertainment device. However, it is to be appreciated that the process of FIG. 7 may be applied to detecting errors within remote controls for any type of device. The process of FIG. 7 may include other operations not illustrated for the sake of brevity.

The process includes receiving user input, at a remote control, requesting to remotely control an entertainment device (operation 702). For example, the user input may request to change the channel of a satellite television receiver or perform fast-forwarding, pausing or reversing functions within recorded content. In at least one embodiment, a key code or other command is transmitted to the entertainment device responsive to the user input.

The process further includes detecting an error within the remote control responsive to receiving the user input (operation 704). As described above, errors may be encountered during loading of data from non-volatile memory (NVM) or while reading and/or writing data to RAM. In at least one embodiment, errors may also be encountered when a processor is reset responsive to action by a watchdog timer. It is to be appreciated that operation 704 may detect any type of error depending on desired design criteria.

The process further includes transmitting information regarding the error from the remote control to the entertainment device (operation 706). In at least one embodiment, the information may be transmitted to the entertainment device as a key code for the entertainment device. In at least one embodiment, the key code may be transmitted to the entertainment device immediately after detection of the error or shortly thereafter.

In other embodiments, the key code may be transmitted to the entertainment device at a later time. For example, the remote control may encounter an error when out of wireless range of the entertainment device. Thus, the remote control may transmit the key code at a later time when the remote control comes within wireless range of the entertainment device. In at least one embodiment, the entertainment device transmits an acknowledgement to the entertainment device regarding reception of the error key code. Thus, if the remote control does not receive the acknowledgment, then the remote control may attempt to transmit the key code to the entertainment device again at a later time. As described above, the remote control may also transmit key codes regarding error conditions to an entertainment device responsive to a query from the entertainment device.

The information received by the entertainment device may be utilized in a variety of manners. As described above, data may be transmitted from the entertainment device to an application server or other remotely operated device or system for further utilization. In some embodiments, the entertainment device may include diagnostic functionality that utilizes the error information to detect and/or correct problems occurring within the remote control. For example, a user may activate the diagnostic functionality of the entertainment device, and the entertainment device may display a diagnostic screen on an associated display device that allows the user to perform various diagnostic operations using the error information or display information regarding the operation of the remote control. It is to be appreciated that the user may activate these functions at any time, including while the user is communicating with a customer service representative (e.g., calling a customer support line). For example, the customer service representative may walk the user through the diagnostic information presented by the entertainment device to obtain the error information of the remote control. The customer service representative may then use this information to identify the remote control problem and recommend possible solutions.

Although specific embodiments were described herein, the scope of the invention is not limited to those specific embodiments. The scope of the invention is defined by the following claims and any equivalents therein.

What is claimed is:

1. A method for detecting errors within a remote control for a controlled device, the method comprising:
   receiving user input, at a remote control, the user input requesting to remotely control the controlled device;
   detecting an error within the remote control responsive to receiving the user input; and
   transmitting information regarding a type of the error from the remote control to the controlled device.

2. The method of claim 1, further comprising:
   storing the information regarding the error on the controlled device.

3. The method of claim 1, further comprising:
   outputting from the controlled device an indication of the error.

4. The method of claim 1, further comprising:
   transmitting the information regarding the error to an application server.

5. The method of claim 1, further comprising:
   receiving, at the controlled device, a query, from an application server, the query requesting the information regarding the error; and
   transmitting the query from the controlled device to the remote control.

6. The method of claim 1, further comprising:
   Receiving, at the remote control, from the controlled device, an acknowledgement message relating to the information regarding the type of the error.

7. The method of claim 1, wherein the error occurs while loading data from a non-volatile memory (NVM) of the remote control.

8. A remote control comprising:
   an input device that receives user input requesting to remotely control a controlled device;
   a processor communicatively coupled to the input device that generates a first message for the controlled device based on the user input, that identifies an error occurring during generation of the first message and that generates a second message based on the error, the second message identifying a type of the error; and
   a wireless transmitter communicatively coupled to the processor that transmits the second message to the controlled device.

9. The remote control of claim 8, wherein the second message comprises a key code.

10. The remote control of claim 9, further comprising:
    a non-volatile memory (NVM) that stores settings of the remote control;
    wherein the processor identifies the error during retrieval of the settings from the non-volatile memory (NVM).

11. The remote control of claim 9, wherein the processor identifies the error during retrieval of data from a volatile memory of the remote control.

12. The remote control of claim 8, further comprising:
    a storage medium;
    wherein the processor updates a counter based on the error and stores the counter on the storage medium.

13. The remote control of claim 12, wherein the processor receives a query from the controlled device, the query requesting transmission of the counter from the remote control to the controlled device.

14. A controlled device comprising:
    a wireless module that wirelessly communicates with a remote control to receive first and second messages, the first message including a command for the controlled device and the second message indicating a type of an error occurring within the remote control; and
    a processor communicatively coupled to the input module and communicatively coupled to the wireless module that control its operation based on the first message and that transmits information associated with the second message to an application server, wherein the application server utilizes the second message to diagnosis the error occurring within the remote control.

15. The controlled device of claim 14, wherein the processor outputs an indication of the error for presentation by a presentation device.

16. The controlled device of claim 14, wherein the processor transmits the second message to the application server responsive to a query from the application server.

17. The controlled device of claim 14, wherein the processor queries the remote control for the second message.

18. A call processing system that receives a call from a user of a controlled device regarding an error that occurred in a remote control associated with the controlled device, the controlled device having received a message from the remote control regarding a type of the error, the call processing system transmitting a query to the controlled device requesting information regarding the type of the error and that processes the information regarding the type of the error received from the controlled device to diagnosis a source of the error in the remote control, wherein an operator of the call processing system utilizes the source of the error to recommend a solution to the user.

19. The call processing system of claim 18, wherein the query further requests a number of times that the error has occurred within the remote control.

20. The call processing system of claim 18, wherein the error occurs while loading data from a non-volatile memory (NVM) of the remote control.

* * * * *